(12) United States Patent
Geisler

(10) Patent No.: US 6,597,367 B2
(45) Date of Patent: Jul. 22, 2003

(54) METHOD AND DEVICE FOR DISPLAYING DRIVER INFORMATION ON A COMMON DRIVER INFORMATION DISPLAY

(75) Inventor: Thomas Geisler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 09/751,500

(22) Filed: Dec. 29, 2000

(65) Prior Publication Data

US 2001/0024208 A1 Sep. 27, 2001

(30) Foreign Application Priority Data

Dec. 30, 1999 (DE) .......................................... 199 63 754

(51) Int. Cl.$^7$ ............................................... G06T 15/00
(52) U.S. Cl. ....................................................... 345/629
(58) Field of Search ................................ 345/629, 419, 345/630, 632, 633, 636

(56) References Cited

U.S. PATENT DOCUMENTS

| | | | | |
|---|---|---|---|---|
| 5,742,796 A | * | 4/1998 | Huxley | 345/502 |
| 6,028,583 A | * | 2/2000 | Hamburg | 345/629 |
| 6,266,068 B1 | * | 7/2001 | Kang et al. | 345/629 |

\* cited by examiner

*Primary Examiner*—Phu K. Nguyen
(74) *Attorney, Agent, or Firm*—Kenyon & Kenyon

(57) ABSTRACT

A method and a device for the graphic display of driver information in a motor vehicle, the driver information, originating from various individual devices that are linked to each other via a bus, being able to be depicted using a graphical user interface as the foreground on a background of a common driver information display. A corresponding α-channel is generated in advance in each case using an image processing device, it being assigned to the partial graphics to be inserted, and, together with the corresponding partial graphic bitmap, it being stored in a memory provided in each case in the individual device in question. The result in a superimposition is a correct antialiasing of the partial graphics inserted in front of any background.

8 Claims, 3 Drawing Sheets

METHOD AND DEVICE FOR DISPLAYING DRIVER INFORMATION ON A COMMON DRIVER INFORMATION DISPLAY

FIELD OF THE INVENTION

The present invention relates to a method and a device for the graphic display of driver information in a motor vehicle, it being possible, using a Graphical User Interface (GUI), to represent on any background of a common driver information display driver information originating from different individual devices connected to each other by a bus.

BACKGROUND INFORMATION

Although it is applicable to any motor vehicle, the present invention, and the problem underlying it, is discussed with reference to the display device situated on board an automobile.

In this respect, it should be noted that in the following the concept "driver information display" should be understood in a general sense, as a display in an instrument cluster, as a display in the center console of a motor vehicle, as a display in the rear of the motor vehicle, e.g., in the head restraints of the driver and passengers seats, etc.

Earlier, various individual devices having their own graphical user interfaces were installed in automobiles for the display of driver information, such as radio, telephone, navigational aids, etc. In this context, it has been found that it is inconvenient to provide each individual device with a graphical user interface because the latter can be imaged only on a relatively small individual driver information display of the specific device, for example, a liquid crystal display.

As a consequence of this disadvantage, motor vehicle manufacturers today make use of so-called common driver information displays, which are accommodated centrally in the center console or in the instrument cluster of the motor vehicle and which centrally display driver information originating in different specific instruments. These common driver information displays can have a large format and therefore a better resolution than the individual displays of the individual devices. In addition, the common driver information displays afford the possibility of color reproduction and of reproducing more attractive or easier-to-read symbols. The display form and the design can also be programmed as desired. Furthermore, uniform hardware can be used for different models and variants.

In order to be successful with respect to a product of this type, high-quality graphics are required. This can be achieved by assembling the total graphic image from pre-processed partial graphics. A partial graphic can be a symbol, an alphanumeric sign, a graphic, or a photo-realistic image. However, if a partial graphic of this type is inserted into any background, the result is disturbing effects such as the appearance of stepped areas between the background and the partial graphic.

In one method for superimposing background and partial graphics according to the related art, the background and the partial graphics exist as bitmaps. In this context, the pixels of the partial graphic bitmap which do not belong to the partial graphic are interpreted as transparent, and pixels that are assigned to the partial graphic to be displayed have priority with respect to the pixels of the background of the graphical user interface of the common driver information display. However, the result of superimposition achieved in this manner no longer shows the antialiasing present in the partial graphic against the background.

The problem underlying the present invention therefore can generally be formulated as displaying any and all partial graphics on a display that has any of the possible backgrounds, without disturbing effects.

The compositing (inserting a partial graphic into a background) can be improved. For every pixel (=picture element composed of red, green, and blue components) of the graphic, there exists an additional $\alpha$-value, which controls the combination of the pixels of the partial graphic and of the common background. These $\alpha$-values constitute the so-called $\alpha$-channel, which satisfactorily realizes the transition from the partial graphic bitmap (source) to the background (destination).

In the above-mentioned version, it has proven to be disadvantageous that in embedded systems such as are used in the motor vehicle area, the participating hardware components do not satisfy the requirements for these composition or compositing methods because the computational demands are too great.

SUMMARY OF THE INVENTION

In contrast to the known solutions, the display method according to the present invention has the advantage that pre-processed partial graphics are stored in the individual devices in a motor vehicle and only a few calculating operations are executed for a high-quality compositing of the driver information display, or of the calculating and display units assigned to it.

The idea underlying the present invention rests in the fact that compute-intensive image processing operations, such as texture-mapping of 3-D models, antialiasing (smoothing out stepped areas between the background and an inserted graphic object), etc., are carried out in advance using image processing software. The result can be stored in a bitmap using the so-called $\alpha$-channel. This has the advantage that partial graphics are pre-processed and are stored in advance in the corresponding individual devices as bitmaps. Therefore, these partial graphics can be combined as desired and can be inserted in a common background, in which, using the $\alpha$-channel, a high-quality total graphic can be achieved without stepped-area effects.

Since intensive computing operations are carried out in advance, smaller components having reduced power requirements can be used in the automotive area, because only the most necessary image processing operations are immediately carried out by the components used in the automotive area.

Each individual device, such as radio, telephone, and navigational aid, in the cockpit of a motor vehicle having a common driver information display as part of the basic equipment of the motor vehicle, contains the partial graphics required by the display such as traffic program symbol, route symbol, telephone numbers-display, etc., corresponding to the functions belonging to them that are to be represented in the common driver information display.

Therefore, every manufacturer himself can determine the presentation on the graphical user interface of the individual device provided by him without suffering a loss of quality in the compositing. In addition, the user has the option of setting his total graphic against any of the possible backgrounds because the compositing can be carried out in any color combination while maintaining the antialiasing of the partial graphics.

According to one preferred refinement, a filtering is carried out of a supersampling of the partial graphic bitmap.

According to one preferred refinement, from the partial graphic bitmaps, graphic double images are produced, in which color picture elements of the supersampling of the specific partial graphic bitmap that are assigned to the backgrounds of the partial graphic are displayed as black picture elements, and color picture elements that are not assigned to the backgrounds are displayed as white picture elements.

According to one preferred refinement, by filtering the supersampling of the corresponding graphic double images, gray-key images are generated which are assigned in each case to the corresponding partial graphic bitmaps, each picture element of the gray-key images having a corresponding α-value assigned to it for specifying the gray tone.

According to one preferred refinement, the graphic images having the corresponding associated α-channels are stored in the specific device in a compressed format.

DETAILED DESCRIPTION

Figure 1:
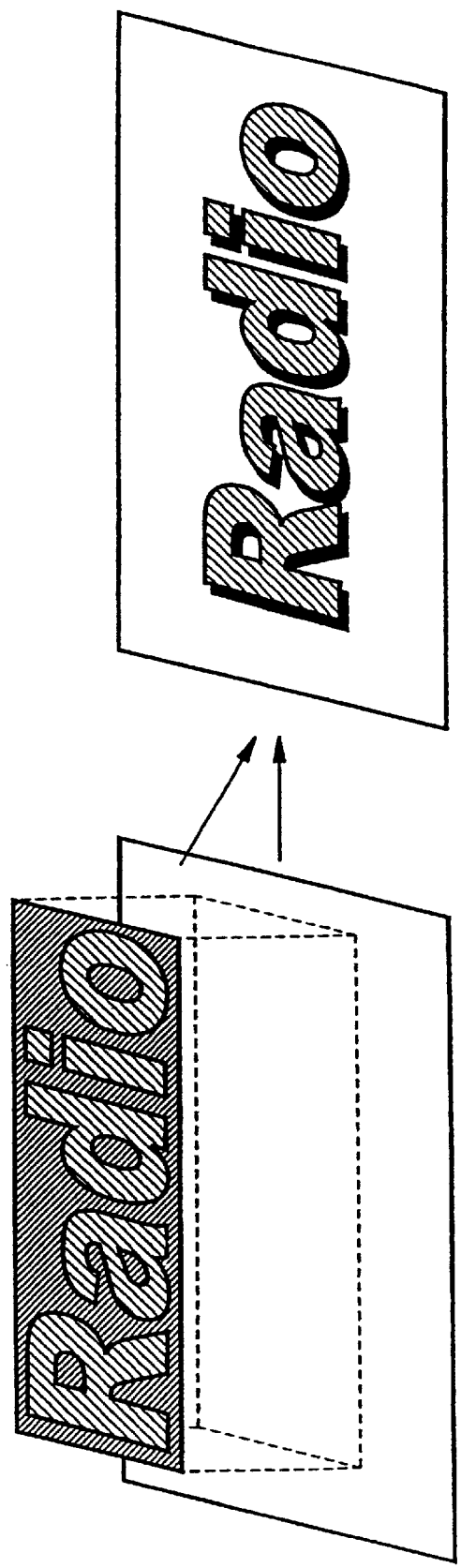
FIG. 1 depicts one overlay variant of a graphic representation against the background image of a common driver information display according to the related art.
Figure 2:
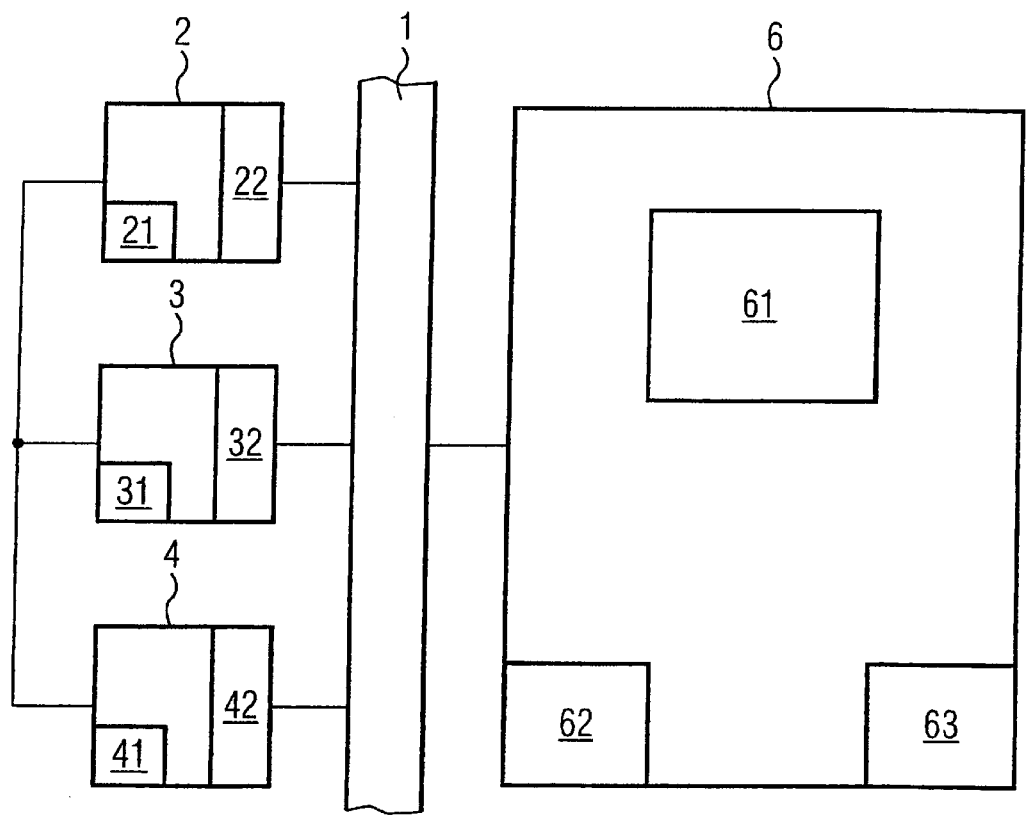
FIG. 2 depicts a block diagram of a device for displaying driver information in a motor vehicle as an exemplary embodiment of the present invention.

FIG. 2 depicts a block diagram of a device for displaying driver information in a motor vehicle as an exemplary embodiment of the present invention.

Belonging to the system depicted in FIG. 2 is an undepicted external image processing device, using which specific graphic images are generated and pre-processed.

In this image processing device, the graphic images produced by a graphics designer are first subjected to a supersampling, and then this supersampling is filtered, as a result of which the edge area between actual partial graphic 8b to be depicted and background 8a of the partial graphic is represented using intermediate colors. This represents but one possibility among many for carrying out an antialiasing.

Then, in the image processing device, graphic double images are generated. For this purpose, the color picture elements of the supersampling of partial graphic bitmap 8 that are assigned to background 8a of partial graphic bitmap 8 are displayed as black picture elements, and the color picture elements that are assigned to actual partial graphic 8b are displayed as white picture elements.

Figure 3:
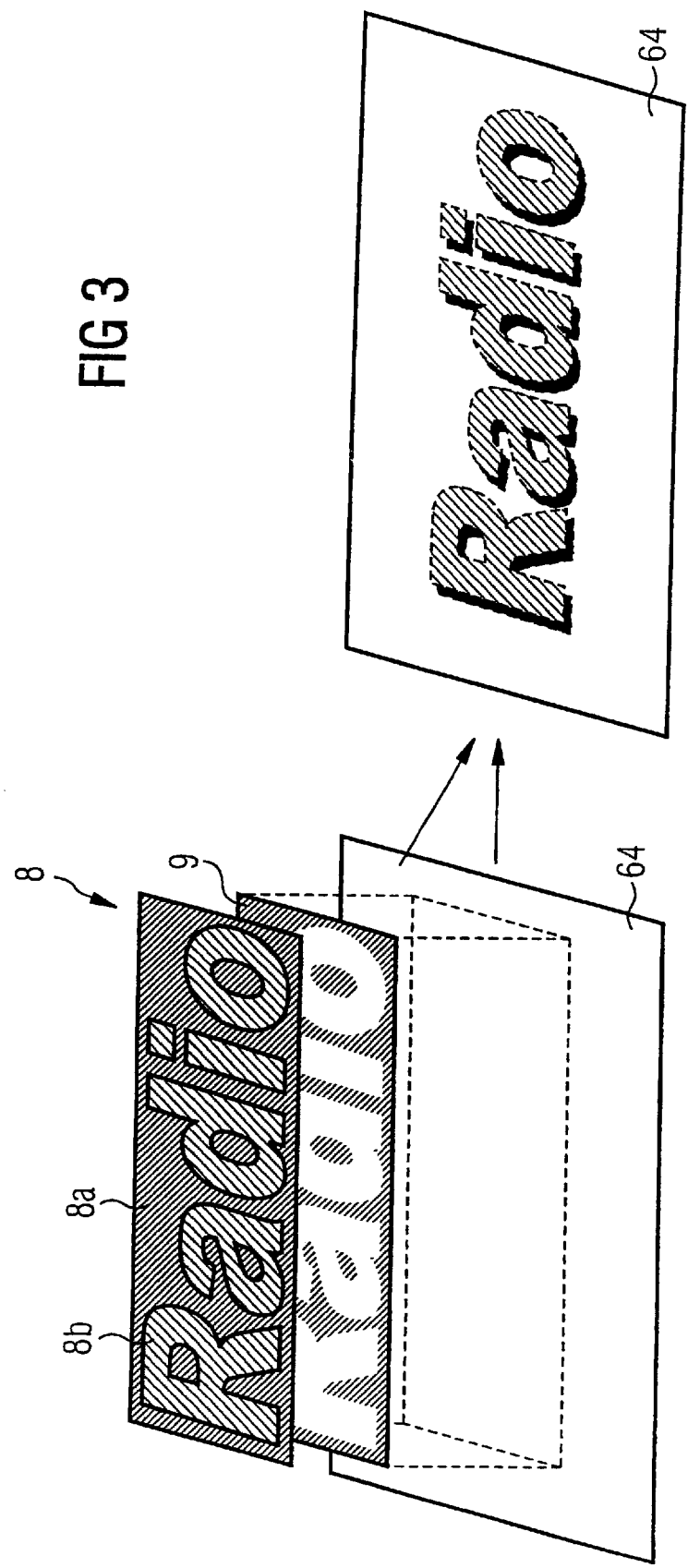
FIG. 3 depicts one overlay variant of a transmitted graphic representation against the background image of the common driver information display according to one exemplary embodiment of the present invention.

This supersampling is processed using the same antialiasing method as the actual partial graphic bitmap, the supersampling of the graphic double image in the image processing device being filtered, resulting in gray-key image 9, depicted in FIG. 3. Each pixel of gray-key image 9 has assigned to it a corresponding α-value, these α-values constituting the so-called α-channel. In this context, an α-value of α=0 signifies that a pixel, made up of the red, green, and blue component, of the partial graphic, designated below as source, is fully transparent. On the other hand, an α-value of α=1 signifies that a source-pixel is completely opaque, i.e., this pixel dominates in comparison to the competing pixel of background 64 (destination) of graphical user interface 61 of common driver information display 6.

The General Calculating Specification for the composite methods for combining the pixels of background 64 and the pixels of source image 8 is as follows:

$$Compositepixel = \alpha \cdot \begin{pmatrix} R_{Source} \\ G_{Source} \\ B_{Source} \end{pmatrix} + (1-\alpha) \cdot \begin{pmatrix} R_{Destination} \\ G_{Destination} \\ B_{Destination} \end{pmatrix} \quad (1)$$

whereby

R, G, B, red, green, blue components of a pixel

α=[0 . . . 1], given that

α=0→source—pixel fully transparent,

α=1→source—pixel fully opaque.

In the image processing device, substitutions and specific calculating operations are carried out in advance. Since the α-value is already determined in the image processing device, several computing operations can already be carried out in it according to the formula (1) and can be substituted. The following preliminary calculations result:

$\alpha \cdot R_{Source} = R^*_{Source}$, $\alpha \cdot G_{Source} = G^*_{Source}$, $\alpha \cdot B_{Source} = B^*_{Source}$ and $1-\alpha=\alpha^*$.

The following is the result from these substitutions according to the formula (1):

$$Compositepixel = \begin{pmatrix} R^*_{Source} \\ G^*_{Source} \\ B^*_{Source} \end{pmatrix} + \alpha^* \cdot \begin{pmatrix} R_{Destination} \\ G_{Destination} \\ B_{Destination} \end{pmatrix} \quad (2)$$

As a result, using the α-channel, all possible calculating operations are carried out in the external image processing device. This affords the advantage that in the Embedded System only one multiplication operation and one addition operation is carried out per pixel-color component.

The system depicted in FIG. 2 contains three individual devices, a radio 2, a telephone 3, and a navigation aid 4. In each individual device 2, 3, 4, an associated memory 21, 31, 41 is provided, in which the associated images of respective individual devices 2, 3, 4 are stored, together with the respective associated α-channels. In addition, the calculating operations conducted in advance are also stored in respective memory 21, 31, 41 of individual device 2, 3, 4 in question.

In the present example, the source images together with the corresponding α-channel are stored in a bitmap format, as a result of which the image material can be generated in advance, i.e. off-line, since on-line generation of the image material is very costly in the execution of an antialiasing method and therefore cannot be carried out in embedded systems.

A transmission device 22, 32, 42, provided in the respective individual device, transmits, in accordance with a preestablished bus-communications schematic diagram (e.g., CAN-bus schematic diagram), a graphic image required in the specific case, together with the corresponding α-channel and the calculation operations, executed in advance, from memories 21, 31, 41 of individual devices 2, 3, 4, in question, via a bus 1 to common driver information display 6.

Driver information display 6 has a calculating device 62 for carrying out certain calculating regimes. Thus the color picture elements stored in memory 21, 31, 41 of graphic image 8 to be depicted are combined with the pixels of background 64 of graphical user interface 61, taking into account the corresponding α-values. This takes place using the calculation regime (2).

In addition, driver information display 6 has a display device 63, for example, a customary graphics controller, using which the total image is realized, composed of background 64 and the inserted graphic of symbol 8b that is actually to be depicted.

As a result of the compositing method executed in accordance with one embodiment of the present invention, it is possible, as can be seen in FIG. 3, to achieve a correct antialiasing of the partial graphics inserted in front of any possible background. In this context, compute-intensive image-processing operations such as texture mapping of 3-D models, antialiasing, etc., are carried out by image processing software. These pre-processed partial graphic bitmaps can be stored in the respective individual devices as partial graphics having a corresponding α-channel. The appearance of graphics combined in this way from partial images is excellent and is equivalent to antialiasing images that are otherwise achievable only on the basis of great calculating effort. In accordance with the present invention, the algorithm used ideally requires two operations per basic color of a pixel and is therefore ideally designed for use in embedded systems.

Although the present invention has been described above on the basis of one preferred exemplary embodiment, it is not limited thereto but rather can be modified in many ways.

In particular, any possible partial graphics from a plurality of individual devices can be inserted together in any background of the driver information display, and partial graphics can be displayed over partial graphics.

What is claimed is:

1. A method for providing a graphic display of driver information in a motor vehicle, the driver information originating from a plurality of individual devices linked to each other via a bus, and the driver information being depicted as a foreground on a background of a common driver information display including a graphical user interface, the method comprising the steps of:

performing a plurality of preselected calculating operations of a predetermined calculation regime in an external image processing device;

storing a partial graphic bitmap corresponding to the driver information to be depicted and including associated α-channels and corresponding results of the plurality of preselected calculating operations conducted in advance in a corresponding one of the plurality of individual devices;

transmitting the partial graphic bitmap required in a specific case along with corresponding ones of the associated α-channels from the plurality of individual devices via the bus to the common driver information display;

combining the partial graphic bitmap required in the specific case and the background of the graphical user interface of the common driver information display, taking into account the corresponding associated α-channels according to the predetermined calculating regime; and depicting a total result on the graphical user interface of the common driver information display.

2. The method according to claim 1, further comprising the step of:

performing a filtering of a supersampling of the partial graphic bitmap.

3. The method according to claim 2, further comprising the steps of:

from the partial graphic bitmap, generating graphic double images, in which color picture elements of the supersampling of the partial graphic bitmap that are assigned to a background of the partial graphic bitmap are configured as black picture elements; and configuring color picture elements that are not assigned to the background of the partial graphic bitmap as white picture elements.

4. The method according to claim 3, further comprising the steps of:

generating gray-key images that are assigned to the partial graphic bitmap by filtering the supersampling of the corresponding graphic double images; and assigning to each picture element of the gray-key images a corresponding α-value for specifying a gray tone.

5. The method according to claim 1, further comprising the step of:

storing the partial graphic bitmap having the corresponding associated α-channels in a respective one of the plurality of individual devices in a compressed format.

6. A device for performing a graphic display of driver information in a motor vehicle, the driver information originating from a plurality of individual devices that are linked to each other via a bus, and the driver information being depicted as a foreground on a background of a common driver information display including a graphical user interface, the device comprising:

a memory arranged in each one of the plurality of individual devices and for storing a partial graphic bitmap corresponding to the driver information to be depicted, the partial graphic bitmap including associated α-channels and corresponding results of a plurality of predetermined calculating operations of a preestablished calculation regime performed in advance in a corresponding one of the plurality of individual devices;

a transmission device arranged in each one of the plurality of individual devices and for transmitting the partial graphic bitmap required in each case along with corresponding ones of the associated α-channels from the plurality of individual devices via the bus to the common driver information display;

a calculating device arranged in the common driver information display and for combining the partial graphic bitmap required in each case and the background of the graphical user interface of the common driver information display, taking into account the corresponding associated α-channels according to the preestablished calculation regime; and a display device arranged in the common driver information display and for depicting a total result on the graphical user interface of the driver information display.

7. The device according to claim 6, further comprising:

an arrangement for performing the plurality of predetermined calculating operations of the preestablished calculating regime in advance in an image processing device and, together with the partial graphic bitmap and respective ones of the associated α-channels, for storing the plurality of predetermined calculating operations in the memory of the corresponding individual device.

8. The device according to claim 7, further comprising:

an arrangement for storing the partial graphic bitmap having the corresponding associated α-channels in the memory of the corresponding individual device in a compressed format.

* * * * *